Dec. 12, 1961     G. SWIFT     3,012,324

DIP MEASURING INSTRUMENT

Filed April 20, 1959     2 Sheets-Sheet 1

INVENTOR.
GILBERT SWIFT
BY
Robert K. Schumacher
ATTORNEY

Dec. 12, 1961 G. SWIFT 3,012,324
DIP MEASURING INSTRUMENT
Filed April 20, 1959 2 Sheets-Sheet 2
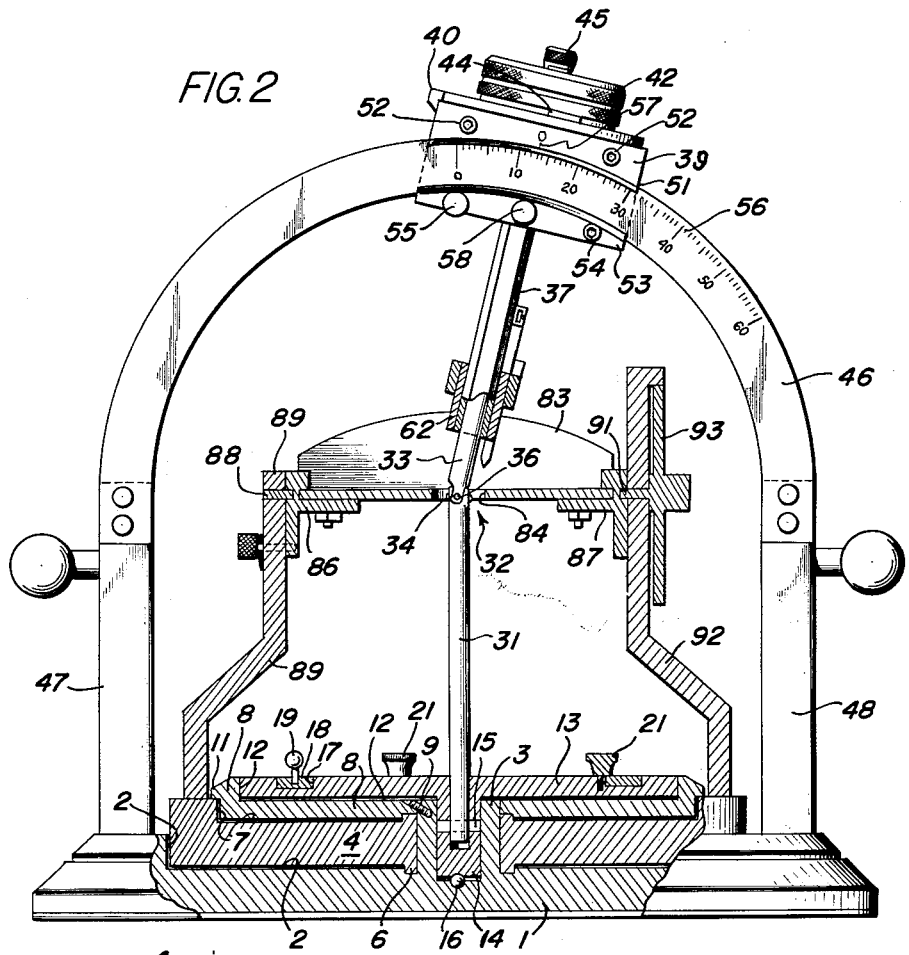
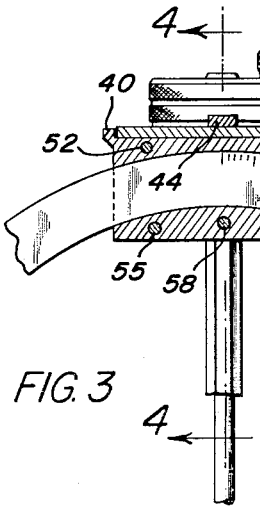
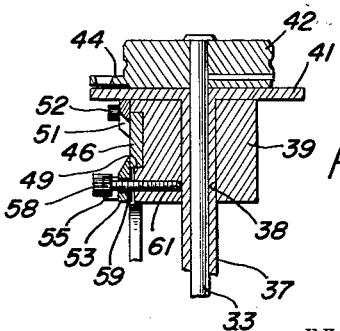
INVENTOR.
GILBERT SWIFT
BY
Robert K. Schumacher
ATTORNEY United States Patent Office 3,012,324
Patented Dec. 12, 1961

3,012,324
DIP MEASURING INSTRUMENT
Gilbert Swift, Tulsa, Okla., assignor, by mesne assignments, to Dresser Industries, Inc., Dallas, Tex., a corporation of Delaware
Filed Apr. 20, 1959, Ser. No. 807,477
9 Claims. (Cl. 33—1)

The present invention relates to measuring instruments and more particularly to a measuring instrument for computing the true dip and true direction of dip of various strata traversed by a logging tool and to provide a physical analog of the precise conditions existing in the well relative to a stratum, the well and the well tool.

In the field of curveying for new sources of crude oil many tests have been devised for determining the nature and disposition of the subsurface formations, since the composition and structure of these formations are often indicative of the presence of oil in the region under investigation. One of the tests thus devised relates to the determination of the nature of the specific strata and, of particular interest to the present invention, a determination of the amount and direction of dip of various strata encountered. The dip of a stratum is defined as the angle with respect to the horizontal at which a stratum intersects a well bore and the direction of the dip is the angle relative to north of the most steeply dipping line which may be drawn in the plane of the stratum.

It has been found that the composition of the rocks forming the various subsurface strata have different abrasion resistances to the drilling operation and therefore the diameter of the well varies in accordance with the nature of the rock in the region. Since a plane in space is determined by any three or more points in that plane, it is possible to define completely the plane of the upper limits or alternatively of the lower limits of a stratum by measuring the vertical depth of the beginning of the stratum at spaced locations about the well bore. In order to obtain such indications, a well tool is withdrawn through the well and is provided with three outwardly extending caliper arms which contact the wall of the well. The displacement of the calipers relative to the center of the tool is measured and recorded against tool depth on a well log. The well log, therefore, provides a complete profile of the well bore at several and preferably three spaced locations thereabout. The dip of the plane relative to the well is obtainable from the above information but in order to obtain the dip relative to the horizontal and the direction of dip relative to magnetic north, the angle and direction of deviation of the well from the vertical and the direction of the calipers must be obtained. Information regarding the direction of these elements in space relative to magnetic north may be obtained from a compass which is positioned within the well tool and is suspended in gimbals so that it always remains in a horizontal position. The direction toward which the north-seeking end of the compass points is measured with respect to a reference or lubber line of the well tool so that all compass readings may be readily interpreted. Very often this reference is taken to be one of the caliper arms which is employed to measure the diameter of the well. Since the well tool is aligned with the well, the angle of well deviation is measured by measuring the angle between the direction of the tool axis and vertical as indicated by a plumb line or pendulum mechanism.

From the above information; that is, the direction and depth of the three measured points of the strata and the direction and angular position of the well tool, it is possible to determine completely the position of the strata and the well in space and of the relative positions of the strata and the well. Specifically, since the angles between the lubber line and magnetic north, the direction and angle of deviation of the well from vertical and the depths of the calipers are known, the stratum is completely defined with respect to the well, the vertical and magnetic north.

It is therefore a primary object of the present invention to provide a mechanical analog computer for producing a direct physical analog of the positions in space of the well and stratum under investigation.

It is another object of the present invention to provide a dip measuring instrument for computing the amount and direction of dip of a stratum, which instrument includes a few simple adjustable members whose adjustments do not interact so that the various settings may be put into the instrument in any order as desired and in which the apparatus for inserting related readings are grouped together.

It is another object of the present invention to provide a measuring instrument for computing the dip of a stratum in which the direction of the dip is uniquely determined without the possibility for a 180° error occurring in the reading of the angle.

It is another object of the present invention to provide a dip measuring instrument which compensates for a directional error resulting from the fact that the compass in the well tool is always maintained in a horizontal position whereas the mechanism for reading the compass is secured to the well tool and therefore at times is inclined with the well tool relative to the position of the compass in its horizontal plane.

It is another object of the present invention to provide a dip measuring instrument from which may be read the direction of dip of a stratum and the direction of the deviation of the well from the vertical, with both readings being presented with respect to both magnetic and true north.

It is still another object of the present invention to provide a dip measuring instrument which is simple and rugged and in which settings may be made rapidly without regard to order of insertion.

In accordance with the present invention there is provided a base member having upstanding arms and a semicircular yoke supported on the upstanding arms. A slidable carriage is provided on the semi-circular yoke and a first shaft has one end supported in the carriage for rotation about its own longitudinal axis. A second shaft is coupled to the first shaft by a universal joint and extends downwardly and is secured to a disc which lies in the horizontal plane and is rotatably supported in the base. A sleeve is disposed about the upper shaft and is rotatable with respect thereto and also with respect to the carriage. The sleeve carries three outwardly extending arms which are perpendicular thereto and each of the arms has a downwardly depending arm perpendicular thereto. The downwardly depending arm is pointed at its lower end and is adjustable both longitudinally and perpendicularly with respect to the outwardly extending arm to which it is adjustably secured. Disposed below the arms is a flat plate having a central aperture therein which surrounds the universal joint interconnecting the upper and lower shafts. This plate is supported by two upstanding members which extend upwardly from a rotatable platform having an axis of rotation coaxial with the axis of the lower shaft and disposed between the base and the disc. The plate is further supported for rotation about an axis parallel to the plane of the upper surface of the plate.

In order to operate the instrument the upper shaft is rotated relative to the sleeve to establish between the computer lubber line (in this case one of the outwardly extending arms) and the computer magnetic north indication an angle equal to the measured angle between the tool reference or lubber line (in this case one of the outwardly extending caliper arms) and magnetic north. The rotation of the upper shaft is imparted to the lower shaft through the universal joint and therefore rotates the aforesaid disc. The position of the sleeve and the shaft are thereupon fixed relative to one another, and then the sleeve is rotated relative to the sliding carriage to establish between the computer lubber line and the plane of the sliding carriage an angle equal to the angle between the tool reference direction and the direction of the deviation of the well from the vertical as determined from the dip log. The carriage is now moved along the yoke in a direction and by an amount equal to the deviation of the well from the vertical and then each of the downwardly depending arms is adjusted both outwardly and downwardly each by an amount equal to its position when it detects a change in well bore diameter associated with the stratum under investigation. The outward extension represents the radius, or more conventionally the diameter, of the well whereas the movement of the pointed arm perpendicular to its supporting arm represents the depth where the caliper detected the variation in diameter under consideration relative to an arbitrary datum position, conveniently chosen just above the highest detected point associated with the particular stratum. The relative positions of the pointed lower ends of the three downwardly depending arms in space as well as relative to the upper shaft which represents the well are now identical with the three measured points of the stratum in the well. Further, the upper shaft and its associated sleeve have the same position in space as the well tool and therefore all conditions with respect to these members are the same as with respect to the corresponding members in the well. The plate is now rotated and the set of arms is lowered until all three of the pointed ends of the downwardly depending arms contact the plate. The position of the plate now corresponds to the surface of the stratum investigated. The angle of this plate relative to the horizontal is measured on a scale inscribed on a vertical disc secured directly to one of the pivots of the plate. The direction of the dip of the stratum may be read from a scale inscribed on the horizontal disc relative to the rotating platform while the direction of deviation of the well may be read from this disc relative to the base. This latter measurement is a "corrected" measurement; that is, the angle as originally measured in the well may have been incorrect while the measurement read from the scale on the disc is correct. More particularly and as previously indicated, the compass employed to measure magnetic north is supported in gimbals and therefore is always maintained in a horizontal plane. The apparatus for measuring the position of the pointer of the compass, however, is secured to the well tool and therefore assumes varying angles relative to the horizontal and therefore relative to the compass. It is found, as will be discussed in greater detail subsequently, that the relationship between the true angle and the angle measured is a function of the angle of deviation of the tool from the vertical and of the angle of the compass needle relative to the lubber line of the instrument. However, if a crossed-pivot universal joint is employed between the upper and lower shafts and if the pivot secured to the lower shaft is aligned with the north-south direction on the horizontal disc, the correct rotation is applied to the disc when the angle as actually read is applied to the upper shaft.

In the instrument, all scales are placed immediately adjacent their associated indicators so that no parallax occurs in any of the readings. Further, the arms which represent the calipers of the well log are disposed above the plate and are vertically adjustable so that they may be brought into appropriate engagement therewith. Further, the lower disc is provided with an annular ring set in a recess in the disc and magnetic declination for a particular area under investigation may be inserted into the ring so that not only may positions relative to magnetic north be read from the various scales but also the positions of the various elements relative to true north may be indicated.

It can be seen from the above that nine distinct readings may be inserted into the instrument in any order whatsoever to obtain a complete physical analog of the well, the stratum and the tool within the well and that this provides a ready visual indication to the investigator of the conditions as they truly existed at the time of measurement.

It is therefore another object of the present invention to provide a mechanical analog dip computer which may be rapidly set up to effect a reading, since all adjustments are easily inserted and are completely independent of one another and may be applied to the instrument in any desired sequence.

It is yet another object of the present invention to provide a mechanical analog dip computer which measures a corrected angle of well deviation both with respect to magnetic and true north.

Still another object of the present invention is to provide a mechanical analog dip computer which provides indications of the direction of well deviation as well as the amount and direction of the dip of a stratum under investigation.

The above and still further objects, features and advantages of the present invention will become apparent upon consideration of the following detailed description of one specific embodiment thereof, especially when taken in conjunction with the accompanying drawings, wherein:

FIGURE 2 is a cross-sectional view in elevation of the apparatus shown in FIGURE 1;

FIGURE 3 is a detailed view partly in section of the movable carriage which rides on the semi-circular yoke of the frame of the apparatus shown in FIGURE 1; and FIGURE 4 is a view taken along section 4—4 of FIGURE 3.

Figure 1:
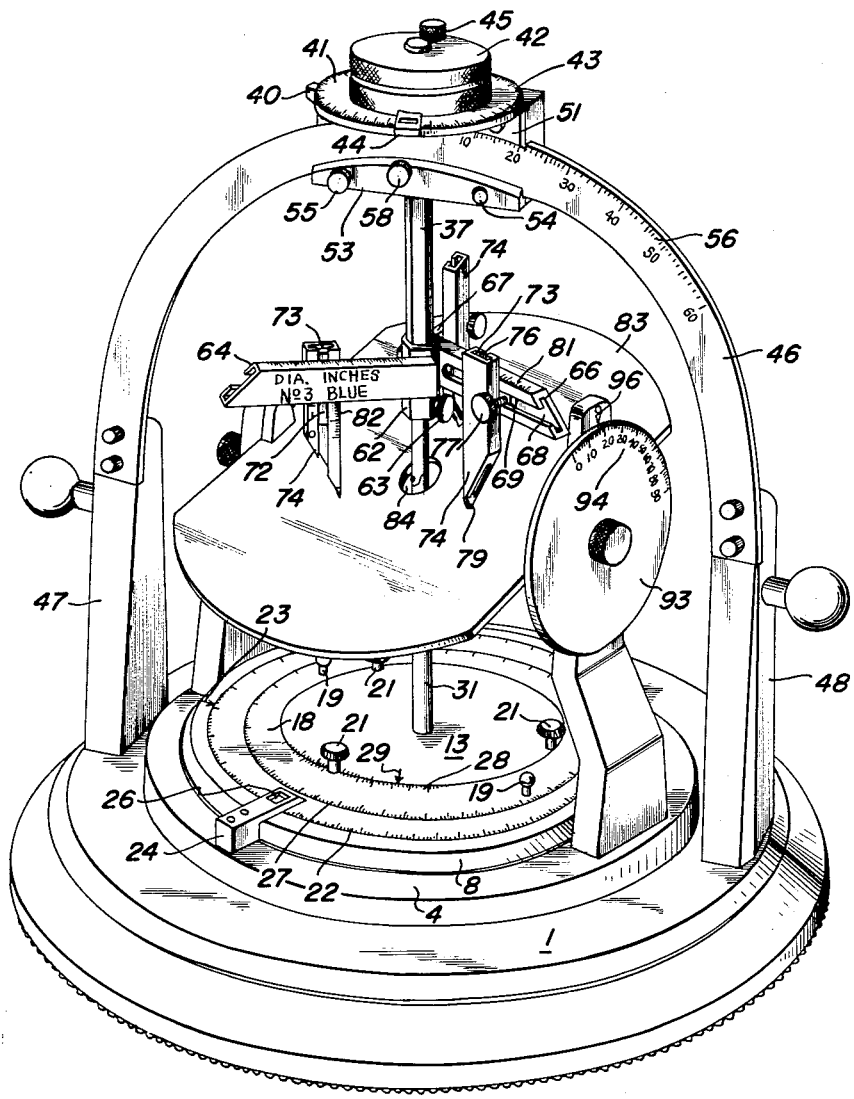
FIGURE 1 is a perspective view of the apparatus of the invention.

Referring specifically to FIGURES 1 and 2 of the accompanying drawings, the dip analog computer of the present invention comprises a circular base member 1 having a generally rectangular vertical cross section. The base 1 is provided with a circular recess 2 in its upper surface and a hollow cylindrical member 3 coaxial of the center of the base 1 and extending vertically upward from the bottom surface of the recess 2. Disposed within the recess 2 is a rotatable platform 4 which is secured to a central hub 6 disposed about the central cylindrical member 3. Thus, the platform 4 is supported by the hub 6 and is rotatable about the hollow cylindrical member 3. The upper surface of the platform 4 is provided with a circular recess 7, the surface of which lies below the upper surface of the cylindrical member 3. A plate 8 is disposed within the recess 7 above the plate 4 and is secured to the cylindrical member 3 by a set screw 9. The plate 8 has a circular outwardly extending flange 11 disposed over the upper surface of the rotatable platform 4. The upper surface of the plate 8 is provided with a recess 12, the upper surface of which is substantially flush with the upper surface of the hollow cylindrical member 3, formed on the base member 1.

A circular plate 13 having a T-shaped vertical cross section, so as to provide a downwardly depending leg 14, is disposed in the recess 12 in the plate 8 and its leg 14 extends into the central aperture in the hollow cylindrical member 3. The plate 13 is supported vertically by a single ball bearing 16 resting in an indentation in the bottom wall of the central aperture in the hollow member 3 and engages the side or vertical walls of the recess 12 in order to obtain lateral support. The upper surface of the plate 13 is provided with an annular recess 17 in which is disposed a flat metallic ring 18 rotatable within the recess 17. Ball and pin arrangements 19 are secured to the annulus 18 in order to facilitate rotation thereof, and three thumb screws 21, only two of which are illustrated in FIGURE 2 but all three of which are illustrated in FIGURE 1, are employed for clamping the annulus 18 in place with respect to the plate 13.

The outer edge of the disc 13 adjacent the disc 8 is provided with a scale 22 which is read in conjunction with a pointer 23 formed on the disc 8 at a predetermined orientation with respect to the base 1 as will be indicated subsequently. The scale 22 is also read by means of an indicator 24 secured to the rotatable platform 4. The indicator 24 has a window 26 formed therein and the window defining surface adjacent the scale 22 has an arrow formed thereon. The annulus 18 has a scale 27 formed along its outer periphery and a scale 28 formed along its inner periphery. The scale 27 is read against an arrow formed on the outer surface of the indicator 24 and the scale 28 is read against an arrow 29 formed on the disc 13 adjacent the inner periphery of the groove 17 and in alignment with the north indication formed on the scale 22.

A vertical shaft 31 is secured by pin 15 to the disc 13 and is coaxial with the downwardly depending leg 14 thereof. The upper end of the shaft 31 is coupled via a universal joint 32 to a further shaft 33, the universal joint 32 being of the crossed-pivot type and including a pin 34 which passes through the shaft 31 and a further pin 36 which passes through the shaft 33. For proper operation of the instrument, as will be explained subsequently, the axis of pin 34 must be parallel to the north-south direction on the scale 22. Disposed about the shaft 33 is a long hollow cylindrical sleeve 37 which is rotatable about the shaft 33 and which has a hexagonally shaped outer surface.

Referring to FIGURES 3 and 4, the upper end of the sleeve 37 extends through an aperture 38 in an adjustable carriage 39. The upper end of the sleeve 37 terminates in a flat circular plate 41 which rests on the top surface of the carriage 39. The shaft 33 extends completely through the sleeve 37 and is secured at its upper end to a hand wheel 42 which is disposed above the plate 41. The plate 41 is provided about its outer periphery with an azimuth scale 43 and an indicator 44 formed integrally with the hand wheel 42 is adapted to read the scale 43 on the plate 41. The scale 43 is also adapted to be read by an indicator 40 formed on the carriage 39. The wheel 42 is provided with a thumb screw 45 which is threaded into the wheel 42 and adapted to engage the upper surface of the plate 41 so that the wheel 42 may be locked in position relative to the plate 41.

The adjustable carriage 39 is adapted to slide along a semi-circular yoke 46 supported by two legs 47 and 48 which are secured to the base 1 at diametrically opposed points adjacent its outer periphery and the center line through the legs 47 and 48 passes through the axis of the shaft 31. The yoke 46 is accommodated in an arcuate recess 49 in the front surface of the carriage 39 and the yoke 46 is offset from the center of the legs 47 and 48 by a distance equal to the distance from the center of the shaft 33 to the yoke 46 as viewed in FIGURE 4. In this way when the shaft 33 is vertical the axes of the shafts 31 and 33 coincide. The adjustable carriage 39 is slidably secured to the yoke 46 by a first plate 51 which abuts the surface of the housing 39 immediately under the plate 41 and is secured thereto by means of suitable bolts 52. The plate 51 overlaps the yoke 46 but does not exert pressure thereagainst so that it provides merely a guiding function. A second plate 53 is secured to the surface of the block 39 immediately below the recess 49 by means of a bolt 54 and a thumb screw 55. The plate 53 is spaced slightly from the adjacent surface of the movable carriage 39 so that by tightening or loosening the thumb screw 55, the plate 53 may be brought into or released from frictional engagement with the adjacent surface of the yoke 46 so as to either lock the carriage 39 into place or to release it for movement along the yoke 46, this movement being indicated by the position of a scale 56 on yoke 46 relative to an indicator 57 formed on plate 51 at the center of the carriage 39. It is apparent that in order for the carriage 39 to be movable along the semi-circular yoke 46 that the center of rotation of the shaft 33 must lie at the center of curvature of the yoke 46 as indicated in the drawings. The plane of this rotation includes pointer 23 as an indicator of the direction of yoke 46. Carriage 39 can be usably moved in but one sense relative to vertical along yoke 46. Index pointer 23 is located on plate 8 in the opposite sense to indicate the direction of the foot of shaft 33.

As previously indicated, the sleeve 37 which is rotatable about the shaft 33 is also rotatable with respect to the movable carriage 39 and in order to lock the sleeve 37 in place with respect to the carriage 39 there is provided a thumb screw 58 which passes through an enlarged aperture 59 in the plate 53 and is disposed in threaded engagement with an aperture 61 in the block 39. The aperture 61 communicates with the outer surface of the sleeve 37 so that when it is wished to lock the sleeve 37 in place with respect to the carriage 39 it is merely necessary to turn the thumb screw 58 until the screw engages the sleeve 37.

An arm holder 62 is disposed about the sleeve 37 and is adapted to slide up and down thereon. Relative angular rotation between the holder 62 and the sleeve 37 is prevented due to the hexagonal shape of the mating surfaces of the two elements. The axial position of the holder 62 relative to the shaft 37 is fixed by a thumb screw 63 which is adapted to engage the sleeve 37 when tightened. Three arms 64, 66, and 67 are secured to the arm holder 62 and extend outwardly therefrom displaced 120° relative to one another. The arm 66 lies along the lubber line of the instrument and therefore is aligned with the zero degree line of the scale 43 on the disc 41. Each of the arms 64, 66, and 67 is secured to one of the hexagonal flats of the arm support 62 and in order to produce the 120° spacing every other flat is employed.

Each of the arms 64, 66, and 67 is generally rectangular in cross section. Further, each of the arms, and reference is made hereinafter only to the arm 66 since all arms are identical, has a rectangularly shaped channel formed therein and an elongated slot 68 is formed in the vertical side surface of the arm which engages the flat of the arm support 62. A guide member 69 is disposed in the recess and generally fills the recess so as to provide a sliding guide which has very little play therein. The guide 69 has a necked down portion which passed through the aperture 68 and which supports a downwardly extending guide having a configuration similar to the guide 68 but being disposed perpendicular thereto. The downward guide is disposed within a central aperture 73 of an arm 74 having a slot 76 formed in the surface thereof which abuts the surface of the arm 66 having the slot 68 formed therein. As a result of this construction the arm 74 is inwardly-outwardly slidable along the length of the arm 66 and is movable with respect to the arm 66 along the downward guide. A thumb screw 77 is employed for locking the guide 69 to the arm 66 so as to prevent undesired inward-outward movement of the arm 74 relative to the arm 66 and at the same time acts by lever action to clamp arm 74 between the downward guide and arm 66 to prevent undesired up-down movement of the arm 74 relative to the arm 66. The lower end of the arm 74 is formed into a point 79 in alignment with the surface of the arm closest to the sleeve 37. Actually it is unimportant which of the surfaces of the arm 74 have the points formed thereon provided the respective indicating scales are appropriately arranged and the illustrated arrangement is exemplary only. The points must be positioned on the arm 74 so that they move radially with respect to the axis of shaft 33 upon movement of arm 74 along its outwardly extending companion arm.

The upper surface of the arm 66 has a scale 81 formed thereon and this scale is read along the surface of the arm 74 on which the point 79 is formed. The arm 74 is provided with a scale 82 which is read along the bottom surface of the arm 66 and determines the distance of the point 79 down from the arm 66.

The arm support 62 is adapted to be moved axially downward or upward as necessary to a position such that the points 79 on the arms 74 may engage a plate 83, the angular position of which relative to the horizontal is intended to indicate the dip of the strata under investigation. The plate 83 is a circular disc with two diametrically opposed segments removed, and has a central circular aperture 84 in which is disposed along the axis of the shaft 31. The plate 83 is supported at the centers of the surfaces defining the chords of the removed segments by means of supports 86 and 87. The support 86 is provided with an outwardly protruding pin 88 which extends through an aperture in upstanding arm 89 secured to the upper surface of the rotatable base 4 outwardly of its recess 7. The support 87 is pivotally supported by means of an outwardly protruding pin 91 extending through an aperture in an upstanding arm 92 which is secured to the base 4 in a position diametrically opposed to the arm 89. The two arms 89 and 92 are disposed at 90° angles with respect to the indicator 24.

The pivot pins 88 and 91 are horizontally aligned so that the plate 83 is permitted to pivot about a horizontal axis. The upper surface of plate 83 is parallel to this axis. The pivot pin 91 has secured thereto, on its end remote from the support 87, a circular dial 93 which is adapted to rotate with the pin 91. The dial 93 carries a scale 94 which is read adjacent an arrow or other suitable indicator 96 formed on a portion of the arm 92 extending above the disc 93. Thus, rotation of the plate 83 relative to the horizontal may be read on the scale 94 opposite the indicator 96. Scale 94 is calibrated in but one direction from zero in order that the downward slope of plate 83 is always measured rather than its upward slope. To perform this measurement the plate 83 always must slope downward in the direction of indicator 24, thus insuring that the direction of the dip be properly measured.

As previously indicated, specific information must be available to apply to the various members of the mechanism and specifically this information must include the angle of the reference or lubber line of the well logging instrument relative to magnetic north, the angle between the lubber line of the instrument and the direction of the deviation of the well from the vertical, and the angular deviation of the well from the vertical. In addition, there must be provided a measurement of the displacement of each of the three caliper arms of the instrument from the center of the well and the depth, below some arbitrary reference datum, of the variations in width of the well which are interpreted as indicating a particular stratum.

In the operation of the instrument, the thumb screw 45 is loosened and the member 42 is rotated so that the angle on the scale 43 read by the indicator 44 is equal to the angular displacement between the lubber line of the instrument and magnetic north as indicated by the compass reading. The thumb screw 45 is then tightened so that this reading is now fixed to the instrument. Next the thumb screw 58 is loosened so that the plate 41 may be rotated relative to the yoke 46 and a reading is set relative to the indicator 40 equal to the angular displacement between the lubber line of the instrument and the direction of the deviation of the well from the vertical, as indicated by the well tool.

The thumb screw 55 may now be loosened and the carriage 39 rotated to the right of the center as illustrated in FIGURE 2 by an amount equal to the well deviation from vertical, as indicated by the scale 56 relative to indicator 57. The thumb screw 55 may thereafter be tightened and the carriage 39 locked in position relative to the yoke 46. The position of the shaft 33 is now the same as the position of the well in space and the position of the arm 66 in space corresponds with the position of the caliper arm of the well logging tool which lies along the lubber line of the well instrument. The next adjustment of the mechanism is to extend the arms 74 outwardly along the arms 64, 66, and 67 until they are at the corresponding distance from the center of the apparatus as the caliper arms were from the center of the apparatus as each detected a change in dimension of the well which is believed to be associated with a common strata. The heights of the arms 74 are now adjusted to correspond to the positions in the well at which the various changes associated with one stratum were detected by each of the calipers. The rotatable base 4 is now rotated and at the same time the arm support 62 is lowered until the points 79 of all of the arms 74 engage the plate 83. Since three points in space define a plane, the positioning of the plate 83 so that it contacts all three of the points 79 of the arms 74 insures that the plate 83 lies in the same position relative to the shaft 33 that the stratum under investigation bore with respect to the well. The dip of the stratum may now be read directly from the scale 94 on the dial 93 and the other directional information desired may be read from the scales 22 and 27.

Before information is read from the scales 22 and 27, the thumb screws 21 are loosened and the magnetic declination in the particular area under investigation is set in by rotating the annulus 18 until the correspondingly marked graduation of the scale 28 appears opposite the indicating arrow 29 on the plate 13. The direction of the deviation from vertical with respect to magnetic north is read opposite the index pointer 23. It is apparent that this reading is obtained from the scale 22 opposite the indicator 23 from the following: Pointer 23 indicates the direction of yoke 46. The shaft 33 was adjusted in rotation relative to the plate 43 to equal the angle between the lubber line and magnetic north, and the dial 41 was adjusted relative to yoke 46 to the angle between the lubber line and the direction of the deviation of the well. Therefore, the position of the shaft 33 relative to the yoke 46 is equal to the algebraic sum of these two angles. The plate 8 is stationary with respect to the yoke 46 and the plate 13 is rotated in accordance with the sum of the rotations applied to the member 42 and the plate 41 and therefore its total rotation relative to yoke 46 as indicated by pointer 23 is equal to the sum of the aforesaid two angles. The direction of the deviation from vertical with respect to true north may be read directly opposite the indicator 23 on the scale 27, since the annulus 18 has the magnetic declination set therein.

The direction of dip of the stratum relative to magnetic north is read directly from the scale 22 whereas its direction relative to true north is read from the scale 27, both opposite the indicator 24. As previously indicated the position of the disc 13 or more specifically of the scale 22 thereon is equal to the composite of the angles between the lubber line of the instrument and the magnetic north on the one hand and the lubber line of the instrument and well deviation on the other. The position of the indicator 24 is determined by the position of the rotatable member 4 as determined by the direction of the plate 83 required to produce contact between each of the points 79 and the plate. Therefore, the position of the indicator 24 is indicative of the position of the strata relative to the well and the position of the disc 13 is indicative of the direction of the well with respect to magnetic north and the relative positions of the two members 4 and 13 is equal to the position of the strata relative to magnetic north.

The angles read from the scales 22 and 27 relative to the indicators 23 and 24 are corrected angles, this term referring to correction of the error in reading angles relative to magnetic north when the well and consequently the tool deviate from the vertical. This error arises from the fact that the compass, which points toward magnetic north, is mounted in gimbals so as to remain in a horizontal position whereas the mechanism for reading the compas is secured to the tool and is often tilted relative to the vertical. If, for example, the position of the needle on the compass is read by a photo-system in which the compass needle carries a mirror while a rotating beam of light, having the center of the instrument at its center, is employed to measure the angle of the needle of the compass, the angle at which the light beam intersects the needle mirror varies from its true value when the plane perpendicular to the axis of the well tool is at an angle with respect to the horizontal plane in which the compass lies. Actually, no variation in angle is effected if the compass needle lies in the plane of the well axis and the vertical or 90° with respect thereto, since the scan of the beam, relative to horizontal, is elliptical and it is known that no change in angle is effected under the aforesaid circumstances. However, if the needle lies at any other angle than along one of the axes of the ellipse, the angle read varies with the angle of the needle relative to the axes of the ellipse; the greatest deviation being effected when the needle lies at 45° with respect to the plane of the well axis and the vertical. The relationship between the true direction of the deviation from the vertical relative to magnetic north, the measured angle thereof and the angular amount of deviation of the tool from vertical follows a known geometric law. Specifically, the tangent of the true angle is equal to the tangent of this angle as read from the tool divided by the cosine of the angle of deviation from vertical. This geometric relationship is precisely the same as that followed by the universal joint 32 with respect to the angular relationships between the shafts 31 and 33. Therefore, the angular position of the plate 13 relative to the reference mark 23 on the base member 8 is equal to the correct direction of deviation from vertical of the well with respect to magnetic north rather than to the incorrect angle applied by rotation of the dial 41 relative to the yoke 46 which is representative of the angle as measured in the well.

In addition to the above feature, the apparatus of the present invention is particularly useful in that all elements which have a physical analog in the well have the same positions relative to one another as the elements in the well and there is no inversion of these positions as in apparatus of the prior art. This is one of the shortcomings of prior art devices which is overcome by the instant invention. Further, if north on the scale 22 is oriented in the same direction as magnetic north in the region in which the instrument is being employed all elements on the computer which are of interest are orientated in space the same as all elements which originally were in the well, and therefore the instrument can provide a complete and exact visual analog of conditions as they existed at the time of measurement. Further, the limitations of movement of the shaft 33 in a single direction parallel to the yoke 46 prevents a possible inversion of the angle as applied to the instrument. More particularly, the scale 56 is calibrated to one side only and therefore the possibility of orientating the plate 41 in one direction and then moving the slide 39 in a direction opposite to that required is substantially eliminated. An additional important feature of the apparatus of the present invention is that all readings may be set in at any time relative to one another and no specific order of insertion of readings must be followed. Thus, it is unimportant to the final reading whether the arms 74 are adjusted first or last or the element 42 or disc 41 are adjusted first relative to one another or to any other setting. Thus, the instrument is completely flexible and if one reading is forgotten or in error during the initial setup of the apparatus all readings are not thrown off and only a single adjustment need be made to effect correction.

While I have described and illustrated one specific embodiment of my invention, it will be clear that variations of the details of construction which are specifically illustrated and described may be resorted to without departing from the true spirit and scope of the invention as defined in the appended claims. In particular, where the terms "horizontal" and "vertical" are used with respect to the computer, they indicate the plane of the base member and the direction perpendicular thereto parallel to shaft 31, it being clear that the computer itself need not be used only in a particular position. Having the base actually horizontal permits use of the apparatus with the parts corresponding to the respective tool elements in positions representing actual well conditions. Further, the invention has been described as used in conjunction with information derived from measurements made with a tool having three caliper arms. The computer finds equal application when the measurements are made with a dip logging instrument in which a stratum is identified at each of three equally angularly spaced arms by any other change in characteristic, as by a change in resistivity measured by means of an appropriate electrode array on each of the arms.

What I claim is:

1. A measuring instrument for determining the dip and direction of dip of a subsurface stratum comprising a plate; means for mounting said plate for pivotal movement about a horizontal axis parallel to the upper surface of said plate and for rotation about a vertical axis; an aperture in said plate encompassing said vertical axis; a shaft assembly passing through said aperture, said shaft assembly including an upper shaft, a lower shaft, and a crossed-pivot universal joint interconnecting said shafts; a graduated disc rotatable about the same vertical axis as said plate, said lower shaft being secured to said disc and being coaxial with the vertical axis thereof; a sleeve disposed about said upper shaft and rotatable with respect thereto; a plurality of arms arranged perpendicular with respect to said sleeve and secured thereto at equally spaced intervals thereabout; a plurality of pointed members each extending downwardly from and secured to a different one of said arms for independent movement with respect thereto; means for tilting said upper shaft about said universal joint in a predetermined vertical plane; means for indicating the angle of the plane of said upper surface of said plate relative to the horizontal; and means for indicating the direction of downward slope of said plate with respect to the graduations of said disc.

2. A measuring instrument for determining the dip and direction of dip of a subsurface stratum comprising a plate; means for mounting said plate for pivotal movement about a horizontal axis parallel to the upper surface of said plate and for rotation about a vertical axis; an aperture in said plate encompassing said vertical axis; a shaft assembly passing through said aperture, said shaft assembly including an upper shaft, a lower shaft rotatable about said vertical axis, and a universal joint interconnecting said shafts; a sleeve disposed about said upper shaft and rotatable with respect thereto; a plurality of arms extending outwardly from said sleeve and secured thereto at spaced intervals thereabout; a plurality of pointed members each extending downwardly from and secured to a different one of said arms for independent movement with respect thereto; means for tilting said upper shaft about said universal joint in a predetermined vertical plane; means for indicating the angle of the plane of said upper surface of said plate relative to the horizontal; and means for indicating the angular position of said lower shaft relative to the direction of downward slope of said plate.

3. A measuring instrument for determining the amount and direction of dip of a subsurface stratum which intersects a bore hole, said computer comprising a plate; means for mounting said plate for pivotal movement about a horizontal axis parallel to the upper surface of said plate and for rotation about a vertical axis; an aperture in said plate encompassing said vertical axis; a shaft assembly passing through said aperture, said shaft assembly including an upper shaft, a lower shaft rotatable about said vertical axis, and a universal joint interconnecting said shafts; a sleeve rotatably disposed about said upper shaft; three arms extending outwardly from said sleeve at equally spaced angles thereabout and three pointed members each secured to a different one of said arms generally parallel to said upper shaft; means for adjusting the positions of said pointed members along said arms and also parallel to said upper shaft; means for rotating said sleeve relative to said upper shaft; means for rotating said upper shaft about its own axis; means for independently tilting said upper shaft about said universal joint in a predetermined vertical plane, means for measuring the angular position of said lower shaft relative to said vertical plane, means for indicating the angular position of said lower shaft relative to the direction of downward slope of said plate; and means for indicating the angle between the plane of said upper surface of said plate and the horizontal.

4. The combination in accordance with claim 3 wherein said universal joint is of the crossed-pivot type.

5. A measuring instrument for measuring the amount and direction of dip of a subsurface stratum intersecting a well comprising, a horizontal stationary base, a horizontal platform rotatable about a vertical axis, a plate disposed above said platform and rotatable therewith, means for supporting said plate for pivotal movement about a horizontal axis parallel to the upper surface of said plate, an aperture in said plate encompassing said vertical axis, a graduated disc coaxial with and rotatable about said vertical axis between said platform and said plate, an upper and a lower shaft, said lower shaft being coaxial with said vertical axis and secured to said disc, a universal joint interconnecting said shafts, an arcuate member secured to said base and disposed above said upper shaft, a carriage slidable along said arcuate member in a vertical plane, means securing the end of said upper shaft remote from said universal joint to said carriage, means for rotating said upper shaft about its longitudinal axis relative to said carriage, a sleeve disposed about said upper shaft and rotatable with respect thereto, three arms extending outwardly from said sleeve at spaced angles thereabout, three pointed members each secured to one of said arms, each of said pointed members being adjustable parallel to said sleeve and along its associated arm, means for indicating the angle between the plane of said upper surface of said plate and the horizontal as an indication of the dip of the stratum, means for indicating the direction of downward slope of said plate with respect to the graduations of said disc as an indication of the direction of the dip of said stratum, and means for measuring the angle of said vertical plane with respect to the graduations on said disc as an indication of the direction of the deviation from vertical of said well.

6. The combination in accordance with claim 5 wherein said universal joint is of the crossed-pivot type, wherein said disc carries a north-south indication, and wherein the pivot of said universal joint associated with said lower shaft is aligned with the north-south direction on said disc.

7. The combination in accordance with claim 6 further comprising an annulus, an annular recess in said disc, means for adjustably retaining said annulus in said recess, said annulus being graduated about one of its circumferences in degrees and adjustable with respect to the north-south indication of said disc to the magnetic declination at the geographic loaction of said well.

8. A measuring instrument for determining and producing a true visual representation of the true dip and direction of dip of a subsurface stratum encountered by a bore hole from information derived from a well logging tool having at least three measuring devices angularly spaced about the axis of said tool, which information includes the depth at which each of said devices encountered said stratum, the displacement of said devices from the axis of said tool, the deviation of the tool axis from vertical, the direction of said deviation with respect to a reference direction, and the angular position of said tool with respect to geographical direction, said computer comprising a mounting frame having a horizontal base, and a yoke; read-in apparatus comprising a carriage adjustably mounted on said yoke for displacement from a zero position corresponding to the deviation of said tool axis from vertical, an upper shaft rotatably mounted on said carriage and dependent therefrom in a vertical plane for angular displacement relative to the direction of said vertical plane corresponding to the direction of said deviation, sleeve means mounted on said upper shaft and longitudinally movable with respect thereto and coaxially rotatable with respect thereto for angular displacement with respect to the direction of said vertical plane corresponding to the angular position of said tool with respect to compass direction, and at least three pointers mounted on said sleeve and each being independently movable laterally and longitudinally with respect thereto for displacement with respect to a reference datum corresponding to the lateral and longitudinal position of a respective one of said devices where it encountered said stratum; and read-out apparatus comprising a vertical lower shaft connected to said upper shaft by a universal joint and rotatable about a vertical axis, a flat plate apertured along said vertical axis and mounted on said base for rotation about said vertical axis and about a horizontal axis parallel to the flat upper surface of said plate for displacement into the plane of said pointers when said sleeve is moved to cause said pointers all to rest against said plate, means for indicating the dihedral angle between the plane of said upper surface of said plate and the horizontal as an indication of the dip of the stratum, and means for indicating the direction of downward slope of said plate with respect to the angular position of said lower shaft.

9. A measuring instrument for determining the dip and direction of dip of a subsurface stratum comprising a plate; means for mounting said plate for pivotal movement about a horizontal axis parallel to the upper surface of said plate and for rotation about a vertical axis; an aperture in said plate encompassing said vertical axis; a shaft assembly passing through said aperture, said shaft assembly including an upper shaft, a lower shaft, and universal joint interconnecting said shafts; a graduated disc rotatable about the same vertical axis as said plate, said lower shaft being secured to said disc and being coaxial with the vertical axis thereof; a sleeve disposed about said upper shaft and rotatable with respect thereto; a plurality of arms arranged perpendicular with respect to said sleeve and secured thereto at equally spaced intervals thereabout; a plurality of pointed members each extending downardly from and secured to a different one of said arms for independent movement with respect thereto; means for tilting said upper shaft about said universal joint in a predetermined vertical plane; means for indicating the angle of the plane of said upper surface of said plate relative to the horizontal; and means for indicating the direction of downward slope of said plate with respect to the graduations of said disc.

References Cited in the file of this patent
UNITED STATES PATENTS

| | | |
|---|---|---|
| 2,149,716 | Beattie | Mar. 7, 1939 |
| 2,594,029 | Johnson | Apr. 22, 1952 |
| 2,615,248 | Hildebrandt | Oct. 28, 1952 |

UNITED STATES PATENT OFFICE

CERTIFICATE OF CORRECTION

Patent No. 3,012,324　　　　　　　　　　　　December 12, 1961

Gilbert Swift

It is hereby certified that error appears in the above numbered patent requiring correction and that the said Letters Patent should read as corrected below.

Column 1, line 15, for "curveying" read -- surveying --; column 2, line 8, for "mechanical analog computer" read -- measuring instrument --; column 4, line 12, for "mechanical analog dip computer" read -- dip measuring instrument --; column 9, line 7, for "compas" read -- compass --; column 11, line 70, for "loaction" read -- location --.

Signed and sealed this 24th day of April 1962.

(SEAL)
Attest:

ESTON G. JOHNSON
Attesting Officer

DAVID L. LADD
Commissioner of Patents